United States Patent
Peng et al.

(10) Patent No.: US 10,241,675 B2
(45) Date of Patent: Mar. 26, 2019

(54) METHOD FOR REBUILDING FLASH TRANSLATION LAYER TABLE OF SOLID STATE DRIVE

(71) Applicants: Lite-On Electronics (Guangzhou) Limited, Guangzhou (CN); LITE-ON TECHNOLOGY CORPORATION, Taipei (TW)

(72) Inventors: Yu-Chuang Peng, Taipei (TW); Min-I Hung, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 39 days.

(21) Appl. No.: 15/294,966

(22) Filed: Oct. 17, 2016

(65) Prior Publication Data
US 2018/0039415 A1 Feb. 8, 2018

(30) Foreign Application Priority Data
Aug. 2, 2016 (CN) .......................... 2016 1 0631413

(51) Int. Cl.
G06F 3/06 (2006.01)
(52) U.S. Cl.
CPC ............ *G06F 3/0604* (2013.01); *G06F 3/061* (2013.01); *G06F 3/064* (2013.01); *G06F 3/0644* (2013.01); *G06F 3/0659* (2013.01); *G06F 3/0665* (2013.01); *G06F 3/0679* (2013.01)

(58) Field of Classification Search
CPC ..... G06F 3/065; G06F 3/0679; G06F 2212/72
See application file for complete search history.

(56) References Cited

U.S. PATENT DOCUMENTS

| | | | |
|---|---|---|---|
| 8,171,205 B2* | 5/2012 | Royer | G06F 12/0246 365/185.33 |
| 2011/0302445 A1* | 12/2011 | Byom | G06F 12/123 714/6.1 |
| 2015/0058539 A1* | 2/2015 | Huang | G06F 11/14 711/103 |
| 2016/0283401 A1* | 9/2016 | Virajamangala | G06F 12/122 |
| 2017/0270040 A1* | 9/2017 | Shin | G06F 12/0246 |

* cited by examiner

*Primary Examiner* — Tracy A Warren
(74) *Attorney, Agent, or Firm* — WPAT, PC

(57) ABSTRACT

A method is provided for rebuilding a flash translation layer table of a solid state drive. The superblock includes plural superpages. Each of the plural superpages includes plural physical pages. The method includes steps of confirming if the flash translation layer table is lost or not after the solid state drive is powered on; if the flash translation layer table is lost, starting a superblock scanning method for determining a status of the superblock; and rebuilding the flash translation table according to the status of the superblock. The superblock scanning method includes steps of reading contents of a first physical page and a last physical page of a last superpage in the superblock, and determining a status of the superblock according to the contents of the first physical page and the last physical page.

13 Claims, 4 Drawing Sheets

METHOD FOR REBUILDING FLASH TRANSLATION LAYER TABLE OF SOLID STATE DRIVE

This application claims the benefit of People's Republic of China Patent Application No. 201610631413.9, filed Aug. 2, 2016, the subject matter of which is incorporated herein by reference.

FIELD OF THE INVENTION

The present invention relates to a control method for a solid state drive, and more particularly to a superblock scanning method for a solid state drive.

BACKGROUND OF THE INVENTION

As is well known, a solid state drive (SSD) is a data storage device that uses a non-volatile memory to store data. After data are written to the flash memory, if no electric power is supplied to the flash memory, the data are still retained in the solid state drive.

FIG. 1 is a schematic functional block diagram illustrating a conventional solid state drive. As shown in FIG. 1, the solid state drive 10 comprises a controlling circuit 110, a buffering element 130 and a non-volatile memory 120. The controlling circuit 110 is in communication with a host 12 through an external bus 20. Consequently, commands and data can be exchanged between the controlling circuit 110 and the host 12. Generally, the external bus 20 is a USB bus, an SATA bus, a PCIe bus, or the like. For example, the buffering element 130 is a volatile memory such as a dynamic random access memory (DRAM).

In the solid state drive 10, the controlling circuit 110 is connected with the buffering element 130 and connected with the non-volatile memory 120 through an internal bus 115. Generally, the buffering element 130 comprises a data buffer for temporarily storing the write data from the host 12 or temporarily storing the read data to be outputted to the host 12.

Generally, the non-volatile memory 120 is composed of one or more chips. In each chip, the storage space is divided into plural blocks. Each block comprises plural pages. Due to the inherent properties of the non-volatile memory, at least one page is written at a time during the writing operation, and the erasing operation is performed in a block-wise fashion. For example, each block comprises 256 pages. Each page is typically 4K bytes or 2K bytes in size.

For increasing the storing capability of the solid state drive 10, the non-volatile memory 120 is composed of plural chips. As the number of chips in the non-volatile memory 120 increases, the storing capability of the solid state drive 10 increases.

For allowing the controlling circuit 110 to access the chips of the non-volatile memory 120 more efficiently and comply with the accessing specification of the non-volatile memory 120, the solid state drive 10 accesses the non-volatile memory 120 according to a superblock configuration. In the solid state drive 10, the corresponding blocks of these chips are defined as a superblock. The plural chips can be controlled and accessed simultaneously through the superblock, and thus the efficiency of accessing the non-volatile memory 120 is enhanced. In other words, the non-volatile memory 120 comprises plural superblocks, and each superblock comprises plural superpages.

FIG. 2 schematically illustrates the architecture of the non-volatile memory of the conventional solid state drive. The internal bus 115 between the non-volatile memory 120 and the controlling circuit 110 comprises plural control signal lines, for example, 8 channels ch0~ch7 and 4 chip enable signal lines CE0~CE3.

As shown in FIG. 2, the non-volatile memory 120 comprises 32 chips c00~c73. Please refer to the arrangement of the chips in a first direction (e.g., the vertical direction). The channel ch0 is connected with the chips c00~c03. The channel ch1 is connected with the chips c10~c13. The channel ch2 is connected with the chips c20~c23. The channel ch3 is connected with the chips c30~c33. The channel ch4 is connected with the chips c40~c43. The channel ch5 is connected with the chips c50~c53. The channel ch6 is connected with the chips c60~c63. The channel ch7 is connected with the chips c70~c73.

Please refer to the arrangement of the chips in a second direction (e.g., the horizontal direction). The chip enable signal line CE0 is connected with the chips c00~c70. The chip enable signal line CE1 is connected with the chips c01~c71. The chip enable signal line CE2 is connected with the chips c02~c72. The chip enable signal line CE3 is connected with the chips c03~c73.

The control signal lines are connected with all of the chips c00~c73. These control signals lines are used for transferring control signals. The control signals contain a command latch enable signal CLE, an address latch enable signal ALE, a read enable signal RE, a write enable signal WE, a write protect signal WP, a ready/busy signal (R/B), and so on.

During the process of accessing the non-volatile memory 120, the controlling circuit 110 selects an opened superblock according to a block number. Moreover, the physical blocks of the chips c00~c73 corresponding to the block number are opened physical blocks. In other words, the opened superblock is equivalent to the set of the opened physical blocks in the chips c00~c73. Moreover, the controlling circuit 110 controls the channels ch0~ch7 and the chip enable signal lines CE0~CE3 to determine the opened physical blocks of the specified chip. That is, the set of the corresponding physical blocks of these chips are defined as a superblock.

For example, in case that each chip of FIG. 2 comprises 1024 physical blocks and each physical block comprises 256 physical pages, the non-volatile memory 120 comprises 1024 superblocks and each superblock comprises 256 superpages.

FIG. 3 schematically illustrates a superblock mapping structure of the non-volatile memory. Generally, the n-th superblock sbn of the non-volatile memory 120 is mapped to the n-th physical blocks b00$n$~b73$n$ of the chips c00~c73, wherein n is an integer in the range between 1 and 1024. As shown in FIG. 3, the n-th physical block of the chip c00 is indicated as b00$n$, the n-th physical block of the chip c10 is indicated as b10$n$, and the rest may be deduced by analogy.

If n=1, the set of the 32 first physical blocks of the 32 chips c00~c73 are collaboratively defined as a first superblock. If n=2, the set of the 32 second physical blocks of the 32 chips c00~c73 are collaboratively defined as a second superblock. The other superblocks have the similar mapping structures.

Moreover, as shown in FIG. 3, the first physical page in the n-th physical block of the chip c00 is indicated as p001, the first physical page in the n-th physical block of the chip c10 is indicated as p101, and the rest may be deduced by analogy.

The set of the first physical pages in the 32 n-th physical blocks of the 32 chips c00~c73 are collaboratively defined as a first superpage sp1. That is, the first superpage sp1 in the n-th superblock sbn is the set of the 32 first physical pages p001~p731. The other superpages in the n-th superblock sbn have the similar mapping structures.

A process of writing a 32-page data into the first superpage sp1 of the n-th superblock sbn will be described as follows. Firstly, the 32-page data is divided into four 8-page data. Then, the chip enable signal line CE0 is activated, and the first 8-page data is written into the first physical pages p001~p701 of the physical blocks b00n~b70n through the 8 channels ch0~ch7. Then, the chip enable signal line CE1 is activated, and the second 8-page data is written into the first physical pages p011~p711 of the physical blocks b01n~b71n through the 8 channels ch0~ch7. Then, the chip enable signal line CE2 is activated, and the third 8-page data is written into the first physical pages p021~p721 of the physical blocks b02n~b72n through the 8 channels ch0~ch7. Then, the chip enable signal line CE3 is activated, and the fourth 8-page data is written into the first physical pages p031~p731 of the physical blocks b03n~b73n through the 8 channels ch0~ch7. Accordingly, the 32-page data is written into the first superpage sp1 of the n-th superblock sbn. The processes of writing data into the other superpages of the n-th superblock sbn are similar to the above process, and are not redundantly described herein.

For reading data from the superpage, the controlling circuit 110 controls the chip enable signal lines CE0~CE3 and the channels ch0~ch7 to read the data from the 32 physical pages. Consequently, the data of the complete superpage can be outputted.

As mentioned above, the controlling circuit 110 of the solid state drive 10 accesses the non-volatile memory 120 according to the superblock configuration. That is, the non-volatile memory 120 comprises plural superblocks, and each superblock comprises plural superpages. Moreover, each superblock is mapped to plural physical blocks, and each superpage is mapped to plural physical pages.

After the opened superblock is full with the write data, the controlling circuit 110 performs a close action and sets the opened superblock as a closed superblock. In addition, the controlling circuit 110 selects another blank superblock of the non-volatile memory 120 as the opened superblock and writes the data into the opened superblock.

When the data in all superpages of the superblock are invalid data, the superblock is erased as a blank superblock by the controlling circuit 110.

SUMMARY OF THE INVENTION

An embodiment of the present invention provides a superblock scanning method for scanning a superblock of a solid state drive. The superblock includes plural superpages. Each of the plural superpages includes plural physical pages. The superblock scanning method includes steps of reading contents of a first physical page and a last physical page of a last superpage in the superblock, and determining a status of the superblock according to the contents of the first physical page and the last physical page.

Another embodiment of the present invention provides a solid state drive. The solid state drive includes a controlling circuit, a buffering element and a non-volatile memory. The buffering element is connected with the controlling circuit. The non-volatile memory is connected with the controlling circuit. The non-volatile memory includes plural superblocks. Each of the plural superblocks includes plural superpages. Each of the plural superpages includes plural physical pages. After the controlling circuit performs a scanning operation on the non-volatile memory, the controlling circuit determines a first portion of the plural superblocks as closed superblocks. The controlling circuit reads contents of a first physical page and a last physical page of a last superpage in the superblock, and determines whether the superblock is the closed superblock according to the contents of the first physical page and the last physical page.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
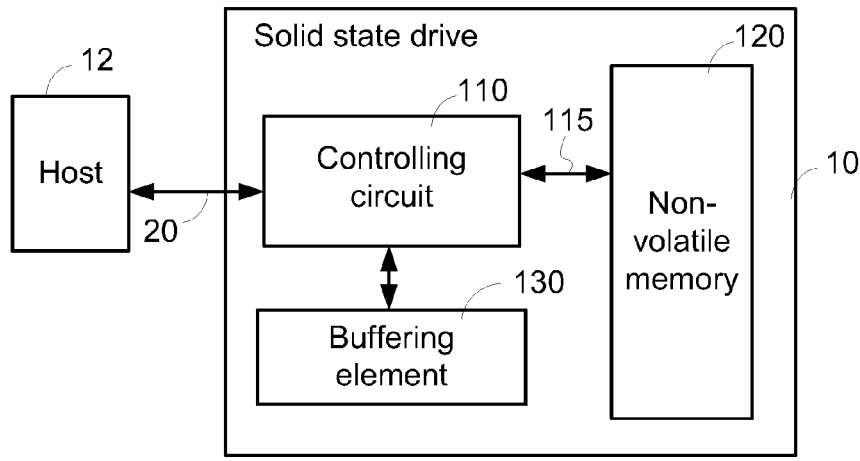
FIG. 1 (prior art) is a schematic functional block diagram illustrating a conventional solid state drive.
Figure 2:
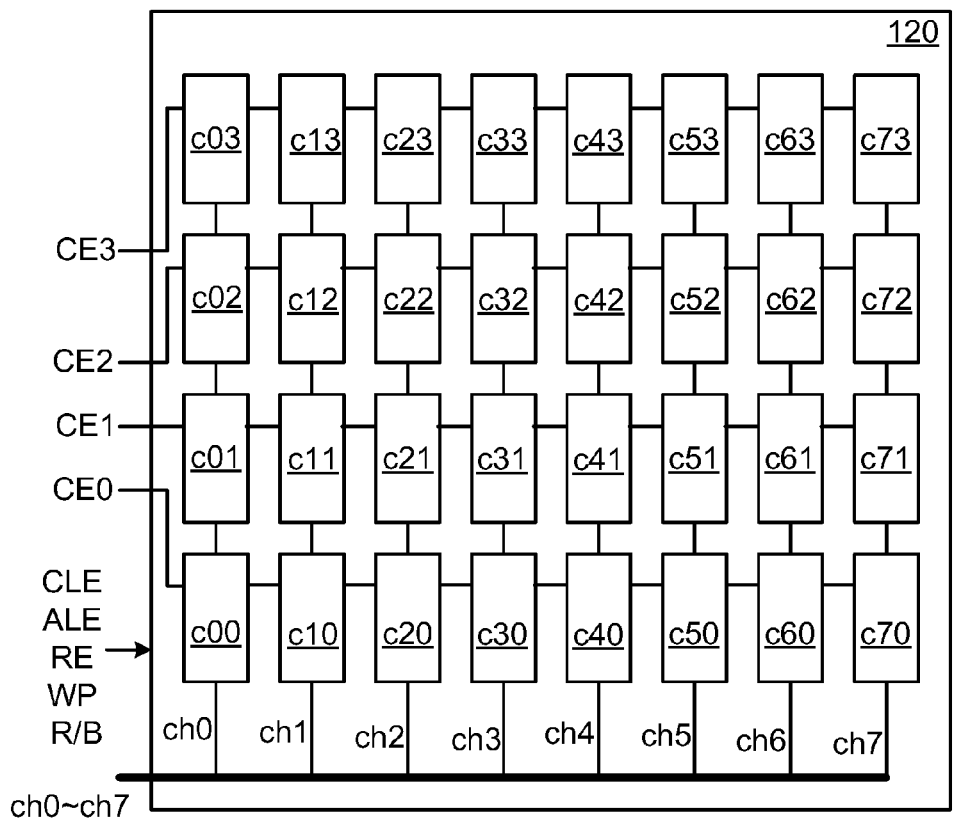
FIG. 2 (prior art) schematically illustrates the architecture of the non-volatile memory of the conventional solid state drive.

The present invention provides a superblock scanning method for a solid state drive. The architecture of the solid state drive is similar to that of FIG. 1. Generally, the host 12 defines the data addresses of the solid state drive 10 through logical block addresses (LBAs). Moreover, the non-volatile memory 120 defines the data addresses of the non-volatile memory 120 through physical allocation addresses (PAAs). Consequently, the solid state drive 10 needs to have a flash translation layer table (FTL table) for mapping LBA into PAA.

In case that electric power is normally supplied to the solid state drive 10, the FTL table is stored in the buffering element 130. When a shutdown command is received by the solid state drive 10, the FTL table is written into the non-volatile memory 120 and then the electric power supplied to the solid state drive 10 is interrupted.

When the solid state drive 10 is powered on again, the FTL table in the non-volatile memory 120 is loaded into the buffering element 130 by the controlling circuit 110. Consequently, the solid state drive 10 can be normally operated.

However, if the solid state drive 10 is suffered from an unexpected power failure, the FTL table is possibly lost because the FTL table is not successfully stored into the non-volatile memory 120 by the controlling circuit 110.

Generally, while the controlling circuit 110 performs a close action on a specified superblock, the relationship between the PAA and the LBA of the specified superblock is recorded in the last superpage of the specified superblock. For example, a specified superblock comprises 256 superpages. While the specified superblock is closed, the relationship between the PAA and the LBA of the specified superblock is recorded in the last superpage (i.e., the 256-th superpage).

Consequently, if the solid state drive 10 is suffered from the unexpected power failure and the FTL table is lost, the controlling circuit 110 has to read the contents of the last superpages of all superblocks after the solid state drive 10 is powered on again. Accordingly, the controlling circuit 110 rebuilds the FTL table. After the controlling circuit 110 confirms that the FTL table is rebuilt, the solid state drive 10 can be normally operated.

Figure 4:
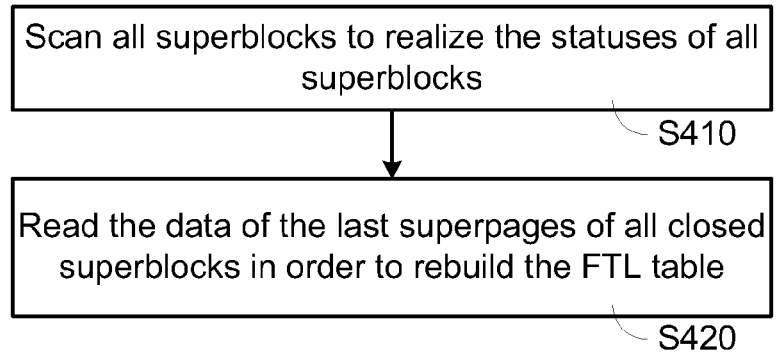
FIG. 4 is a flowchart illustrating a process of rebuilding the FTL table.

FIG. 4 is a flowchart illustrating a process of rebuilding the FTL table. Firstly, the controlling circuit 110 scans all superblocks to realize the statuses of all superblocks (Step S410). Then, the controlling circuit 110 reads the data of the last superpages of all closed superblocks in order to rebuild the FTL table (Step S420).

After the solid state drive 10 is powered on and the controlling circuit 110 confirms that the FTL table is lost, it is necessary to rebuild the FTL table. Firstly, the controlling circuit 110 scans all superblocks of the non-volatile memory 120 to realize the statuses of all superblocks. Generally, after the superblock is scanned, one of the following four statuses of the superblock is realized. In a first status, the superblock is a closed superblock. In a second status, the superblock is being used. In a third status, the superblock is being erased. In a fourth status, the superblock is a blank superblock.

In accordance with the conventional superblock scanning method, the status of each superblock is judged according to the contents of the last superpage of the superblock.

Since one superpage is mapped to the physical pages of plural chips, it is time-consuming to read the contents of all physical pages of the last superpage.

For example, if a superblock is a set of 32 physical blocks, the superpage also contains 32 physical pages. For judging the status of the superblock in the scanning procedure, the conventional superblock scanning method has to read the contents of the last superpage of the superblock. That is, it is necessary to read 32 physical pages to judge the status of one superblock. If the non-volatile memory 120 has so many superblocks, the scanning procedure is more time-consuming.

Figure 5A:
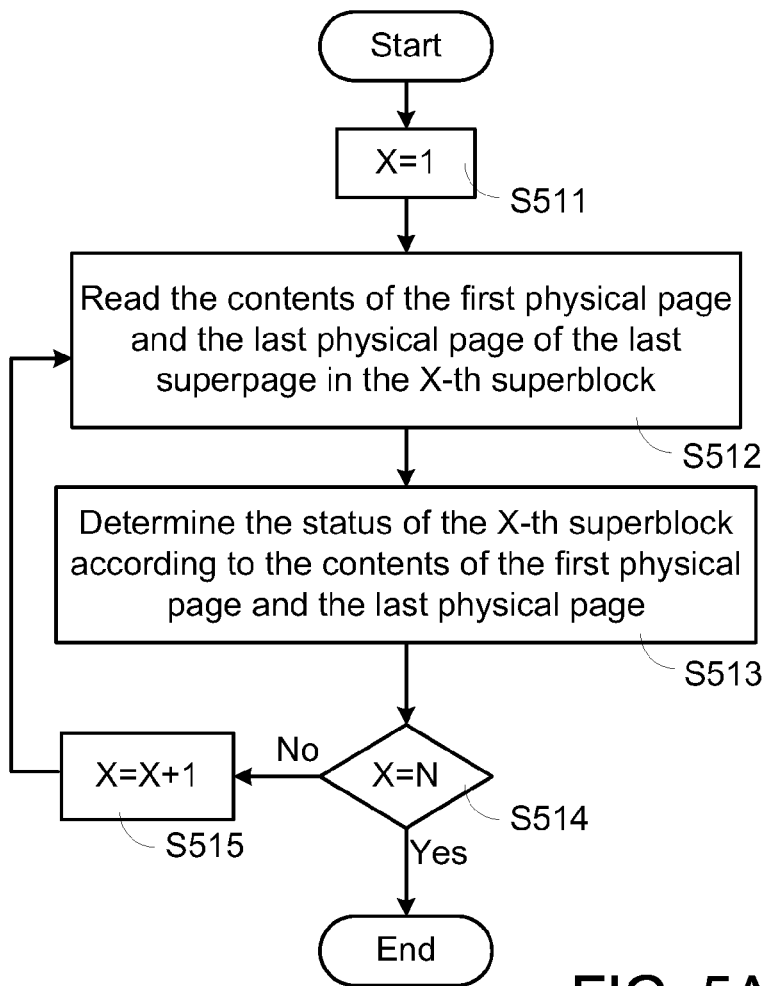
FIG. 5A is a flowchart illustrating a superblock scanning method for a solid state drive according to an embodiment of the present invention.

FIG. 5A is a flowchart illustrating a superblock scanning method for a solid state drive according to an embodiment of the present invention. The superblock scanning method is used for judging the status of the superblock. Moreover, the superblock scanning method can be used to rebuild the FTL of the solid state drive.

Firstly, set X=1 (Step S511). Then, the contents of the first physical page and the last physical page of the last superpage in the X-th superblock are read (Step S512). Then, the status of the X-th superblock is determined according to the contents of the first physical page and the last physical page (Step S513). Then, the step S514 is performed to judge whether X is equal to N. If X is not equal to N (Step S514), set X=X+1 (Step S515). Then, the step S512 is repeatedly done. If X is equal to N (Step S514), the scanning procedure is ended. In this flowchart, N is the number of the superblocks in the non-volatile memory 120. For example, in case that the non-volatile memory 120 comprises 1024 superblocks, N is equal to 1024. That is, the scanning procedure needs to scan 1024 superblocks.

In an embodiment, each superblock comprises plural superpages. While the data are written into a superblock, data are sequentially written into the plural superpages of the superblock according to a specified program sequence. That is, among the superpages of the superblock, data are written into the first superpage in the first sequence, and data are written into the last superpage in the last sequence. While the controlling circuit 110 performs a close action on a specified superblock, the relationship between the PAA and the LBA of the specified superblock is recorded in the last superpage of the specified superblock.

Beside, while the data are written into a superpage, data are sequentially written into the plural physical pages of the superpage according to a data arranging sequence. While data are written into the superpage, the controlling circuit 110 activates the four chip enable signal lines CE0~CE3 and the eight channels ch0~ch7 in a predetermined sequence to write data into the physical pages of the superpage. Consequently, the data arranging sequence of the physical pages in each superpage can be realized according to the predetermined sequence. That is, the data arranging sequence of the physical pages in each superblock is equivalent to the sequence of writing data into the physical pages of the superpage. For example, among the physical pages of the superpage, data are written into the first physical page in the first sequence and data are written into the last physical page in the last sequence.

Figure 3:
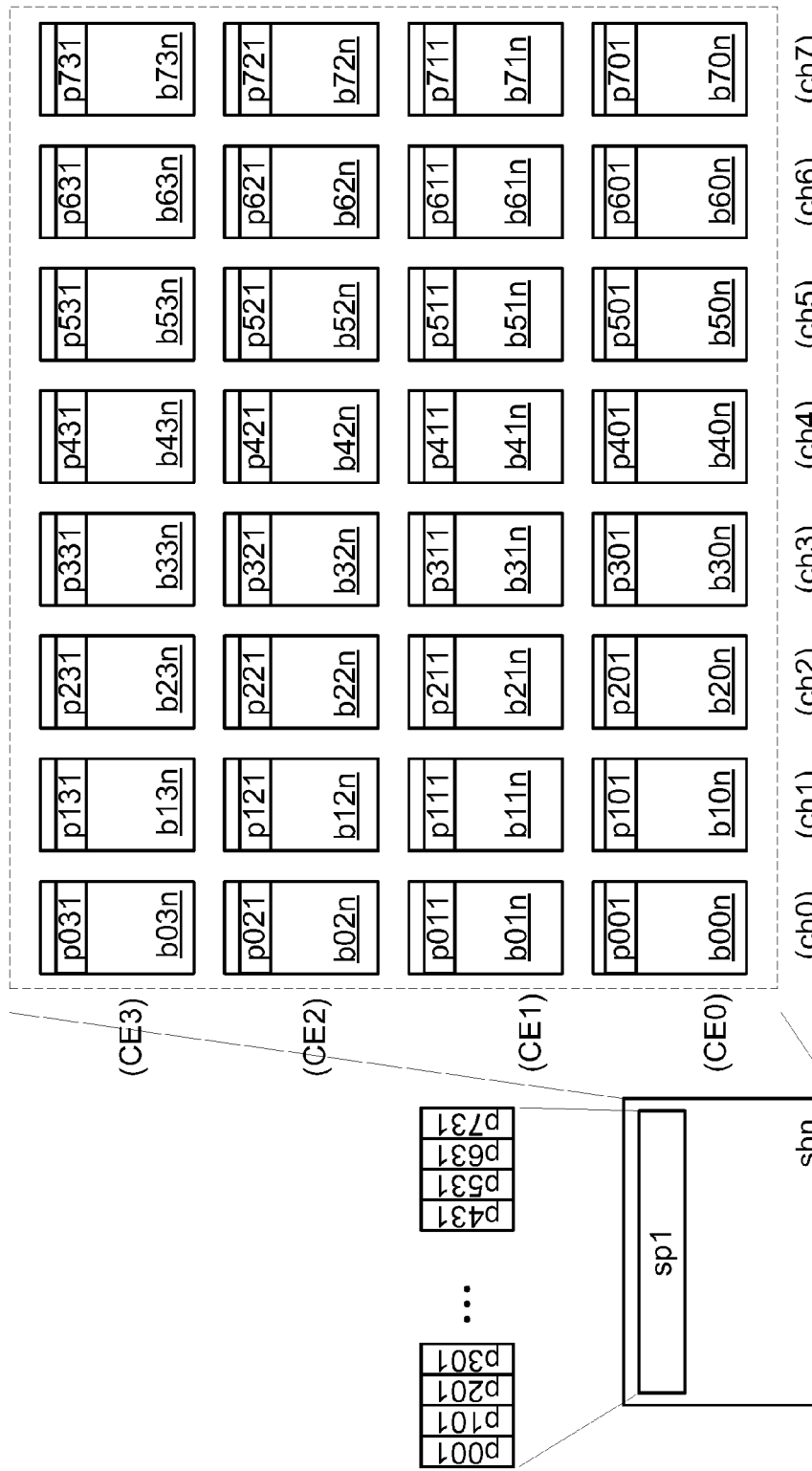
FIG. 3 (prior art) schematically illustrates a superblock mapping structure of the non-volatile memory.

Take FIG. 3 as an example, while the data are written into the superpage sp1 of the superblock sbn, as the chip enable signal lines CE0~CE3 are activated from the chip enable signal line CE0 to the chip enable signal line CE3, the data arranging sequence of the physical pages in the superpage sp1 can be realized as from the physical page p001 to the physical page p731 as shown in FIG. 3. In this case, the first physical page of the superpage sp1 is the physical page p001, and the last physical page of the superpage sp1 is the physical page p731.

In an embodiment, the controlling circuit 110 reads the first physical page and the last physical page of the last superpage of the superblock and judges the status of the superblock according to the data arranging sequence of the physical pages in the superblock. Consequently, the time period of reading data is largely reduced. As the number of the superblocks increases, the benefit of reducing the reading time period becomes more obvious. According to the superblock scanning method of the present invention, the status of one superblock is realized by reading only two physical pages during the process of scanning one superblock.

Figure 5B:
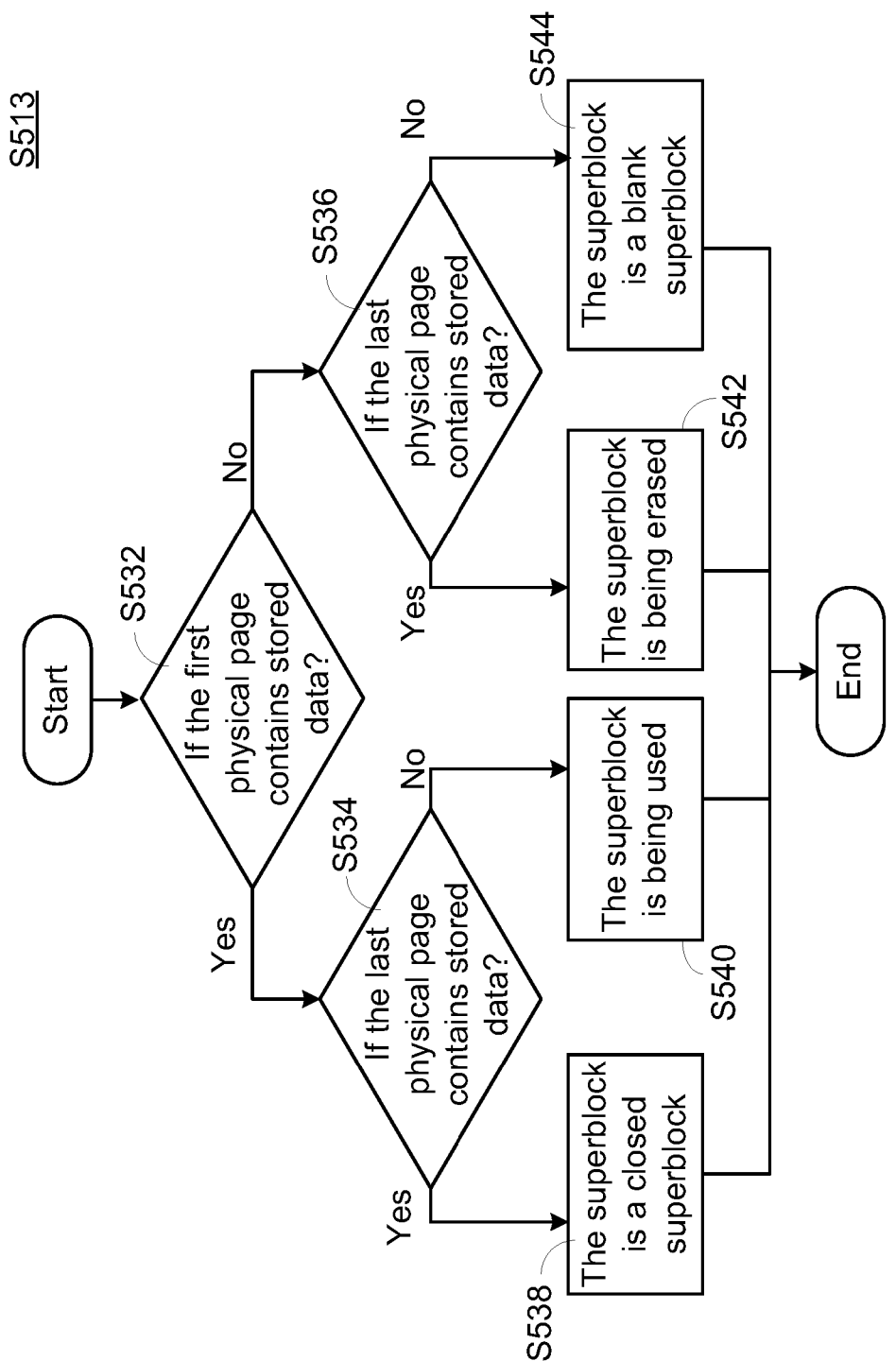
FIG. 5B is a flowchart illustrating the step S513 of determining the status of the superblock in the superblock scanning method of FIG. 5A.

FIG. 5B is a flowchart illustrating the step S513 of determining the status of the superblock in the superblock scanning method of FIG. 5A.

Firstly, the step S532 is performed to judge whether the first physical page contains stored data (Step S532). If the controlling circuit 110 judges that the first physical page contains stored data in the step S532, the controlling circuit 110 continuously judges whether the last physical page contains stored data (Step S534). If the controlling circuit 110 judges that the last physical page contains stored data in the step S534, the controlling circuit 110 judges that the superblock is a closed superblock (Step 538). Whereas, if the controlling circuit 110 judges that the last physical page does not contains stored data in the step S534, the controlling circuit 110 judges that the superblock is being used (Step 540).

Whereas, if the controlling circuit 110 judges that the first physical page does not contain stored data in the step S532, the controlling circuit 110 continuously judges whether the last physical page contains stored data (Step S536). If the controlling circuit 110 judges that the last physical page contains stored data in the step S536, the controlling circuit 110 judges that the superblock is being erased (Step 542). Whereas, if the controlling circuit 110 judges that the last physical page does not contains stored data in the step S536, the controlling circuit 110 judges that the superblock is a blank superblock (Step 544).

The process of determining the status of the superblock is not restricted to the flowchart of FIG. 5B. It is noted that numerous modifications and alterations may be made while retaining the teachings of the invention. For example, in another embodiment of judging the status of the superblock, the controlling circuit 110 firstly judges whether the last physical page contains stored data and then judges whether the first physical page contains stored data.

As mentioned above, if the first physical page and the last physical page of the last superpage in the superblock contain stored data, the controlling circuit judges that the superblock is a closed superblock. Moreover, if the first physical page of the last superpage in the superblock contains stored data but the last physical page is a blank page without stored data, the controlling circuit judges that the superblock is being used. Moreover, if the first physical page of the last superpage in the superblock does not contain stored data but the last physical page contains stored data, the controlling circuit judges that the superblock is being erased. Moreover, if none of the first physical page and the last physical page of the last superpage in the superblock contain stored data, the controlling circuit judges that the superblock is a blank superblock.

From the above descriptions, the present invention provides a superblock scanning method for a solid state drive. The superblock scanning method is used for rebuilding a FTL table of the solid state drive. By reading only two physical pages of the last superpage in the superblock, the superblock scanning method of the present invention is capable of judging the status of the superblock. Consequently, the time period of judging the status of the superblock is effectively reduced.

After the non-volatile memory non-volatile memory is scanned, the controlling circuit determines a first portion of the plural superblocks as closed superblocks. Then, the controlling circuit reads the data of the last superpages of all closed superblocks in order to rebuild the FTL table.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for rebuilding a flash translation layer table of a solid state drive, the solid state drive comprising plural superblocks, each of the plural superblocks comprising plural superpages, each of the plural superpages comprising plural physical pages, the method comprising steps of:
   confirming if the flash translation layer table is lost or not after the solid state drive is powered on;
   if the flash translation layer table is lost, starting a superblock scanning method for determining a status of a selected superblock of the plural superblocks; and
   rebuilding the flash translation layer table according to the status of the selected superblock,
   wherein, the superblock scanning method comprises steps of:
   reading contents of a first physical page and a last physical page of a last superpage in the selected superblock; and
   determining the status of the selected superblock according to only the contents of the first physical page and the last physical page of the last superpage in the selected superblock.

2. The method as claimed in claim 1, further comprising a step of determining the status of the selected superblock according to a result of judging whether the first physical page and the last physical page contain stored data.

3. The method as claimed in claim 1, wherein the first physical page and the last physical page are determined according to a data arranging sequence of the plural physical pages in the last superpage.

4. The method as claimed in claim 1, wherein while writing data into the last superpage, the data are sequentially written into the plural physical pages of the last superpage according to a data arranging sequence that starts from the first physical page and ends in the last physical page.

5. The method as claimed in claim 1, further comprising steps of:
   if the first physical page and the last physical page contain stored data, determining that the selected superblock is a closed superblock;
   if the first physical page contains stored data but the last physical page does not contain stored data, determining that the selected superblock is being used;
   if the first physical page does not contain stored data but the last physical page contains stored data, determining that the selected superblock is being erased; and
   if none of the first physical page and the last physical page contain stored data, determining that the selected superblock is a blank superblock.

6. The method as claimed in claim 1, further comprising steps of:
   if the first physical page and the last physical page contain stored data, determining that the selected superblock is a closed superblock; and
   reading data stored in the last superpage of the closed superblock in order to rebuild the flash translation layer table.

7. A solid state drive, comprising:
   a controlling circuit;
   a buffering element connected with the controlling circuit; and
   a non-volatile memory connected with the controlling circuit, wherein the non-volatile memory comprises plural superblocks, each of the plural superblocks comprises plural superpages, and each of the plural superpages comprises plural physical pages,
   wherein the controlling circuit confirms if a flash translation layer table is lost or not after the solid state drive is powered on;
   wherein if the flash translation layer table is lost, the controlling circuit starts a superblock scanning method for determining a status of a selected superblock of the plural superblocks; and rebuilds the flash translation layer table according to the status of the selected superblock,
   wherein the controlling circuit reads contents of a first physical page and a last physical page of a last superpage in the selected superblock, and determines whether the selected superblock is a closed superblock according to only the contents of the first physical page and the last physical page of the last superpage in the selected superblock.

8. The solid state drive as claimed in claim 7, wherein the controlling circuit determines the status of the selected superblock according to a result of judging whether the first physical page and the last physical page contain stored data.

9. The solid state drive as claimed in claim 7, wherein the first physical page and the last physical page are determined according to a data arranging sequence of the plural physical pages in the last superpage.

10. The solid state drive as claimed in claim 7, wherein while writing data into the last superpage, the data are sequentially written into the plural physical pages of the last superpage according to a data arranging sequence that starts from the first physical page and ends in the last physical page.

11. The solid state drive as claimed in claim 7 wherein if the first physical page and the last physical page contain stored data, the controlling circuit determines that the selected superblock is the closed superblock.

12. The solid state drive as claimed in claim 11, wherein if the first physical page contains stored data but the last physical page does not contain stored data, the controlling circuit determines that the selected superblock is being used, wherein if the first physical page does not contain stored data but the last physical page contains stored data, the controlling circuit determines that the selected superblock is being erased, wherein if none of the first physical page and the last physical page contain stored data, the controlling circuit determines that the selected superblock is a blank superblock.

13. The solid state drive as claimed in claim 7 wherein if the first physical page and the last physical page contain stored data, the controlling circuit determines that the selected superblock is the closed superblock, and reads data stored in the last superpage of the closed superblock in order to rebuild a flash translation layer table.

* * * * *